(12) United States Patent
McCoy et al.

(10) Patent No.: US 7,950,987 B2
(45) Date of Patent: May 31, 2011

(54) AIRCRAFT CABIN PRESSURE CONTROL SYSTEM AND METHOD THAT IMPROVES CABIN PRESSURIZATION DURING TAKE-OFF

(75) Inventors: Gerard L. McCoy, Tucson, AZ (US); Richard K. Morey, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 1388 days.

(21) Appl. No.: 11/234,671

(22) Filed: Sep. 23, 2005

(65) Prior Publication Data
US 2007/0102576 A1    May 10, 2007

(51) Int. Cl.
  *B64D 11/00* (2006.01)
(52) U.S. Cl. ............................................ 454/74; 454/71
(58) Field of Classification Search .................... 454/71, 454/74
See application file for complete search history.

(56) References Cited

U.S. PATENT DOCUMENTS

| | | |
|---|---|---|
| 3,376,803 A | 4/1968 | Emmons |
| 3,473,460 A | 10/1969 | Emmons |
| 3,577,902 A | 5/1971 | Gardner |
| 4,553,474 A | 11/1985 | Wong et al. |
| 5,186,681 A * | 2/1993 | Emmons ......................... 454/74 |
| 5,273,486 A | 12/1993 | Emmons et al. |
| 5,297,987 A | 3/1994 | Emmons et al. |
| 6,544,114 B2 | 4/2003 | Buchholz |
| 2004/0102150 A1 | 5/2004 | Horner |
| 2005/0153648 A1 | 7/2005 | Horner et al. |

OTHER PUBLICATIONS

PCT International Search.
Report PCT/US2006/023995, Dec. 27, 2006.

* cited by examiner

*Primary Examiner* — Kenneth B Rinehart
*Assistant Examiner* — Samantha A Miller
(74) *Attorney, Agent, or Firm* — Robert Desmond, Esq.

(57) ABSTRACT

A cabin pressure control system and method improves cabin pressurization during aircraft take-off operations. The cabin pressure control system sets a cabin pressurization rate limit based on a cabin pressurization rate error. The cabin pressurization rate error is derived from a comparison of a sensed cabin pressure rate-of-change value and a predetermined cabin pressurization rate value.

16 Claims, 4 Drawing Sheets

AIRCRAFT CABIN PRESSURE CONTROL SYSTEM AND METHOD THAT IMPROVES CABIN PRESSURIZATION DURING TAKE-OFF

STATEMENT REGARDING FEDERALLY SPONSORED RESEARCH OR DEVELOPMENT

This invention was made with Government support under F33657-02-C-2000 awarded by the U.S. Air Force. The Government has certain rights in this invention.

TECHNICAL FIELD

The present invention relates to aircraft cabin pressure control and, more particularly, to a system and method for improving cabin pressurization performance during take-off.

BACKGROUND

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes.

As the altitude of an aircraft increases, from its take-off altitude to its "top of climb" or "cruise" altitude, the ambient atmospheric pressure outside of the aircraft decreases. Thus, unless otherwise controlled, air could leak out of the aircraft cabin causing it to decompress to an undesirably low pressure at high altitudes. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Aircraft cabin pressure is often referred to in terms of "cabin altitude," which refers to the normal atmospheric pressure existing at a certain altitude. Studies have shown that the symptoms of hypoxia may become noticeable when the cabin altitude is above the equivalent of the atmospheric pressure one would experience outside at 8,000 feet. Thus, many aircraft are equipped with a cabin pressure control system to, among other things, maintain the cabin pressure altitude to within a relatively comfortable range (e.g., at or below approximately 8,000 feet) and allow gradual changes in the cabin altitude to minimize passenger discomfort.

Some cabin pressure control systems implement control logic that may, when needed or desired, begin pressurizing the aircraft cabin (or "descending" the aircraft cabin) before take-off, either while taxiing on or to the runway or at the start of the take-off roll down the runway. This initial cabin pressurization process is sometimes referred to as "cabin pre-pressurization." The cabin pre-pressurization process, when implemented, is preferably initiated and conducted at a pressurization rate (or "descent rate") that will not cause passenger discomfort. Various standard setting organizations within the aerospace industry have established −300 sea-level-feet-per-minute (slfpm) as the preferred pressurization rate (or descent rate limit). In attempts to quickly achieve this preferred pre-pressurization rate, many current cabin pressure control systems implement pre-pressurization control logic that commands a cabin pressurization rate (descent rate limit) to an artificially high pressurization rate for a pre-determined time period.

Although the above-described cabin pre-pressurization control logic is generally safe, robust, and effective in quickly achieving the preferred cabin pressurization rate, it can exhibit certain drawbacks. For example, the cabin rate response can result in either a rate overshoot, which can lead to potentially uncomfortable cabin pressurization rates, or a rate undershoot, which can lead to insufficient pre-pressurization performance. This rate control inconsistency may be most pronounced with variations in aircraft characteristics, such as cabin air inflow and pressurized volume, which can occur on a flight-by-flight basis. Because these aircraft characteristics can vary significantly, this can lead to inconsistent pre-pressurization performance and customer dissatisfaction.

Hence, there is a need for a cabin pressure control system and method that controls cabin pressurization rate to quickly and consistently pressurize an aircraft cabin at a rate that does not cause passenger discomfort and/or dissatisfaction, and/or at a rate that does not significantly vary with variations in aircraft characteristics. The present invention addresses one or more of these needs.

BRIEF SUMMARY

The present invention provides a cabin pressure control system and method that quickly and consistently pressurizes an aircraft cabin at a comfortable, yet sufficiently rapid, rate.

In one embodiment, and by way of example only, a control unit for controlling aircraft cabin pressurization rate includes a rate command circuit, a comparator, and a rate limiter. The rate command circuit is operable to supply cabin pressure rate-of-change commands. The comparator is configured to receive a predetermined cabin pressure rate-of-change value and sensed cabin pressure rate-of-change values and is operable, in response thereto, to supply cabin pressurization rate error values representative of a difference between the predetermined cabin pressure rate-of-change limit value and the sensed cabin pressure rate-of-change values. The rate limiter is coupled to receive the cabin pressure rate-of-change commands and the cabin pressurization rate error values and is operable, in response thereto, to set a cabin pressurization rate limit based on the cabin pressurization rate errors, and limit the cabin pressure rate-of-change commands to prevent the cabin pressurization rate from exceeding the cabin pressurization rate limit.

In another exemplary embodiment, an aircraft cabin pressure control system includes a cabin pressure sensor and a control unit. The cabin pressure sensor is configured to sense aircraft cabin pressure and supply a cabin pressure signal representative thereof. The control unit is coupled to receive the cabin pressure signal and one or more operational mode signals representative of aircraft operational mode and is operable, in response thereto, to supply actuator control signals. The control unit includes a pressure signal conditioning circuit, a rate circuit, a first comparator, a rate command circuit, a second comparator, and a rate limiter. The pressure signal conditioning circuit is coupled to receive the cabin pressure signal and is operable, in response thereto, to supply a conditioned cabin pressure signal. The rate circuit is coupled to receive the conditioned cabin pressure signal and is operable, in response thereto, to supply a signal representative of sensed cabin pressure rate-of-change. The first comparator is configured to receive a cabin pressure command signal and the conditioned cabin pressure signal and is operable, in response thereto, to supply a cabin pressure error signal representative of a difference between the cabin pressure command signal and the conditioned cabin pressure signal. The rate command circuit is coupled to receive the cabin pressure error signal and the one or more operational mode signals and is operable, in response thereto, to supply a cabin pressure rate-of-change command signal. The second comparator is configured to receive a predetermined cabin pressure rate-of-change limit signal and the sensed cabin pressure rate-of-change signal and is operable, in response thereto, to supply a cabin pressurization rate error signal representative of a difference between the predetermined cabin pressure rate-of-change limit signal and the sensed cabin pressure rate-of-change signal. The rate limiter is coupled to receive the cabin pressure rate-of-change command signal and the cabin pressurization rate error signal and is operable, in response thereto, to set a cabin pressurization rate limit based on the cabin pressurization rate error signal, and limit the cabin pressure rate-of-change command signal to prevent the cabin pressurization rate from exceeding the cabin pressurization rate limit.

In yet another exemplary embodiment, a method of controlling aircraft cabin pressurization rate includes comparing a predetermined cabin pressurization rate value and an actual cabin pressurization rate value to determine a cabin pressurization rate error value. A cabin pressurization rate limit is set based on the cabin pressurization rate error, and the cabin pressurization rate is prevented from exceeding the cabin pressurization rate limit.

Other independent features and advantages of the preferred cabin pressure control system and method will become apparent from the following detailed description, taken in conjunction with the accompanying drawings which illustrate, by way of example, the principles of the invention.

DETAILED DESCRIPTION OF A PREFERRED EMBODIMENT

Before proceeding with the description, it is to be appreciated that the following detailed description is merely exemplary in nature and is not intended to limit the invention or the application and uses of the invention. Furthermore, there is no intention to be bound by any theory presented in the preceding background or the following detailed description.

Figure 1:
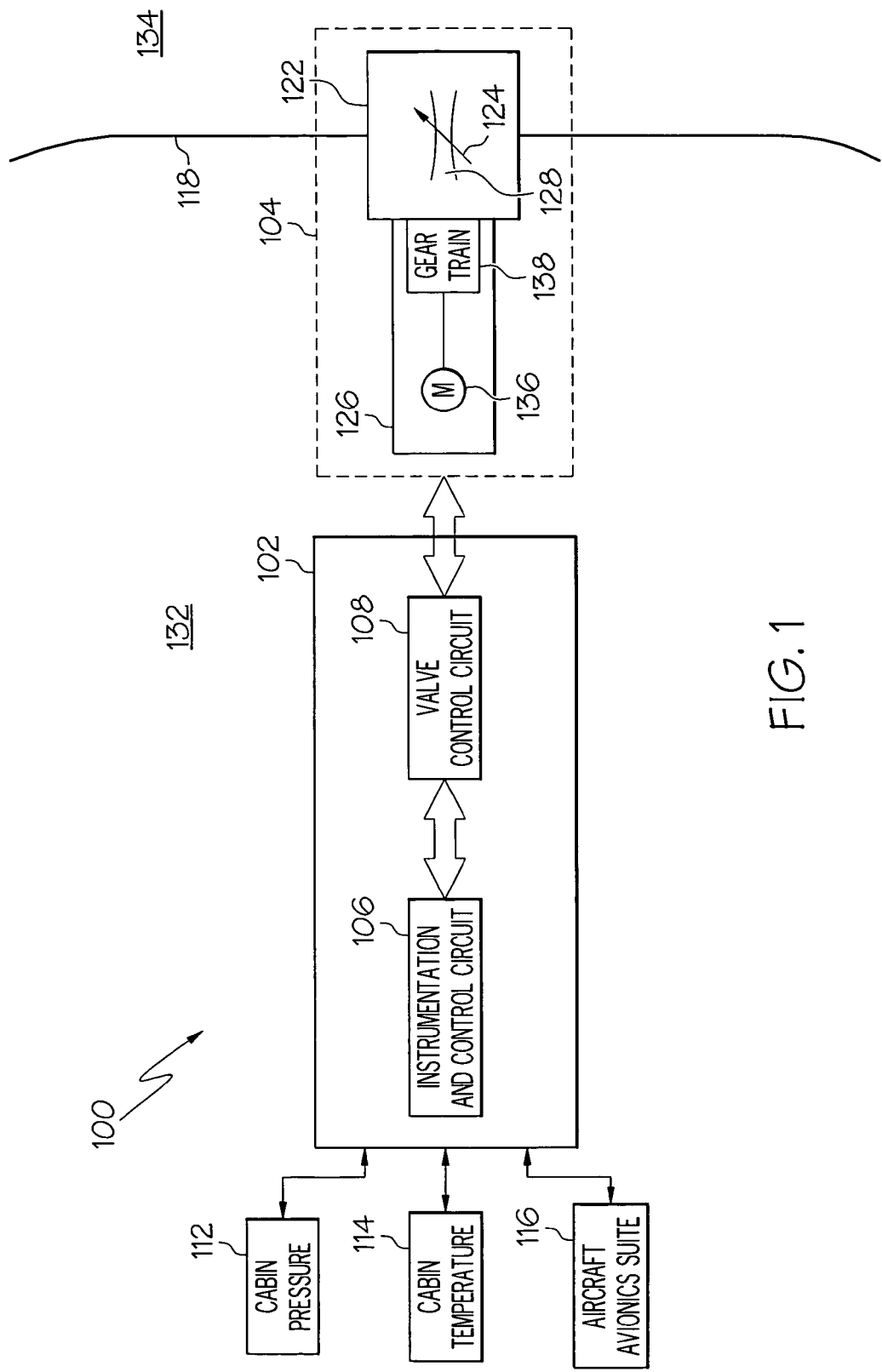
FIG. 1 is a functional block diagram of an aircraft cabin pressure control system according to an embodiment of the present invention.

Turning now to FIG. 1, a functional block diagram of an exemplary aircraft cabin pressure control system 100, and its interconnections to certain other aircraft systems, is shown. In the depicted embodiment, the system 100 includes a control unit 102 and an outflow valve 104. Although not depicted, it will be appreciated that the system 100 may additionally include one or more overpressure relief valves, and one or more negative pressure relief valves. These valves are typically included as part of an aircraft cabin pressure control system but, for clarity and ease of illustration and depiction, are not shown or further described herein. Moreover, before proceeding further with the description of the system 100, it is noted that the depicted embodiment is merely exemplary and that the system 100 could be implemented with two or more independent control units 102, and two or more outflow valves 104.

The control unit 102 includes an instrumentation and control circuit 106 and a valve control circuit 108. The instrumentation and control circuit 106 is coupled to receive signals from a plurality of sensors and other signal sources. In the depicted embodiment, the sensors include a cabin pressure sensor 112, and a cabin temperature sensor 114. It will be appreciated that the sensors 112, 114 depicted and described herein are merely exemplary, and that the system 100 could be implemented with additional or different types of sensors. For example, the system 100 could additionally include one or more atmosphere pressure sensors and/or one or more cabin-to-atmosphere differential pressure sensors.

The cabin pressure sensor 112 is disposed and configured to sense absolute cabin pressure, and is preferably implemented as any one of numerous types of analog pressure sensors. Some non-limiting examples of suitable analog pressure sensors include various semiconductor diaphragm pressure sensors, various capacitance pressure sensors, various optical sensors, and various magnetic sensors. In a particular preferred embodiment, however, the cabin pressure sensor 112 is implemented as a piezoelectric strain gauge sensor.

The cabin temperature sensor 114 is disposed and configured to sense cabin temperature, and is also preferably implemented as any one of numerous types of analog temperature sensors. Some non-limiting examples of suitable temperature sensors include resistance temperature detectors (RTDs), thermocouples, and various types of optical temperature sensors. In a particular preferred embodiment, the cabin temperature sensor 114 is implemented as a RTD. It will be appreciated that the temperature sensor 114 may be omitted in some embodiments. However, the cabin temperature sensor 114, when included, is used to correct the absolute pressure value sensed by the cabin pressure sensor 112 for environmental temperature changes.

The instrumentation and control circuit 106 also communicates with, and receives signals from, the aircraft avionics suite 116 via, for example, ARINC-429, analog, and/or discrete input/output signals. Based on the signals received from the avionics suite 116, as well as signals supplied from the sensors 112, 114, the instrumentation and control circuit 106 computes a desired (or commanded) cabin pressure command, an actual (or sensed) cabin pressure, a desired (or commanded) cabin pressure rate-of-change, an actual (or sensed) cabin pressure rate-of-change, temperature corrected cabin pressure, supplies appropriate actuation control signals to the valve control circuit 108, and additionally supplies various alarm, indication, warning, and/or control signals.

The valve control circuit 108 receives the actuation control signals supplied from the instrumentation and control circuit 106. In response to the actuation control signals, which preferably include speed or duty cycle command information and direction information, the valve control circuit 108 supplies valve command signals to the outflow valve 104, to thereby control the position of the outflow valve 104, and thereby modulate cabin pressure.

The outflow valve 104 is preferably mounted on an aircraft bulkhead 118, and includes a valve body 122, a valve element 124, and a valve actuator 126. The valve body 122 has a flow passage 128 that extends through it, such that when the outflow valve 104 is mounted on the aircraft bulkhead 118, the flow passage 128 is in fluid communication with the aircraft cabin 132 and the external atmosphere 134. The valve element 124 is movably mounted on the valve body 122 and extends into the flow passage 128. The valve element 124 is movable between an open position, in which the aircraft cabin 132 and the external atmosphere 134 are in fluid communication, and a closed position, in which the aircraft cabin 132 is sealed from the external atmosphere.

The valve actuator 126 is coupled to the valve element 124 and positions the valve element 124 to a commanded position, to thereby control cabin pressure. To do so, the valve actuator 126 is coupled to receive the valve command signals supplied by the valve control circuit 108. In response to the supplied valve command signals, the valve actuator 126 moves the valve element 124 to the commanded position. It will be appreciated that the valve actuator 126 may be implemented as any one of numerous types of actuators, but in the depicted embodiment the valve actuator 126 is implemented with a motor 136 and a suitable gear train 138.

Figure 2:
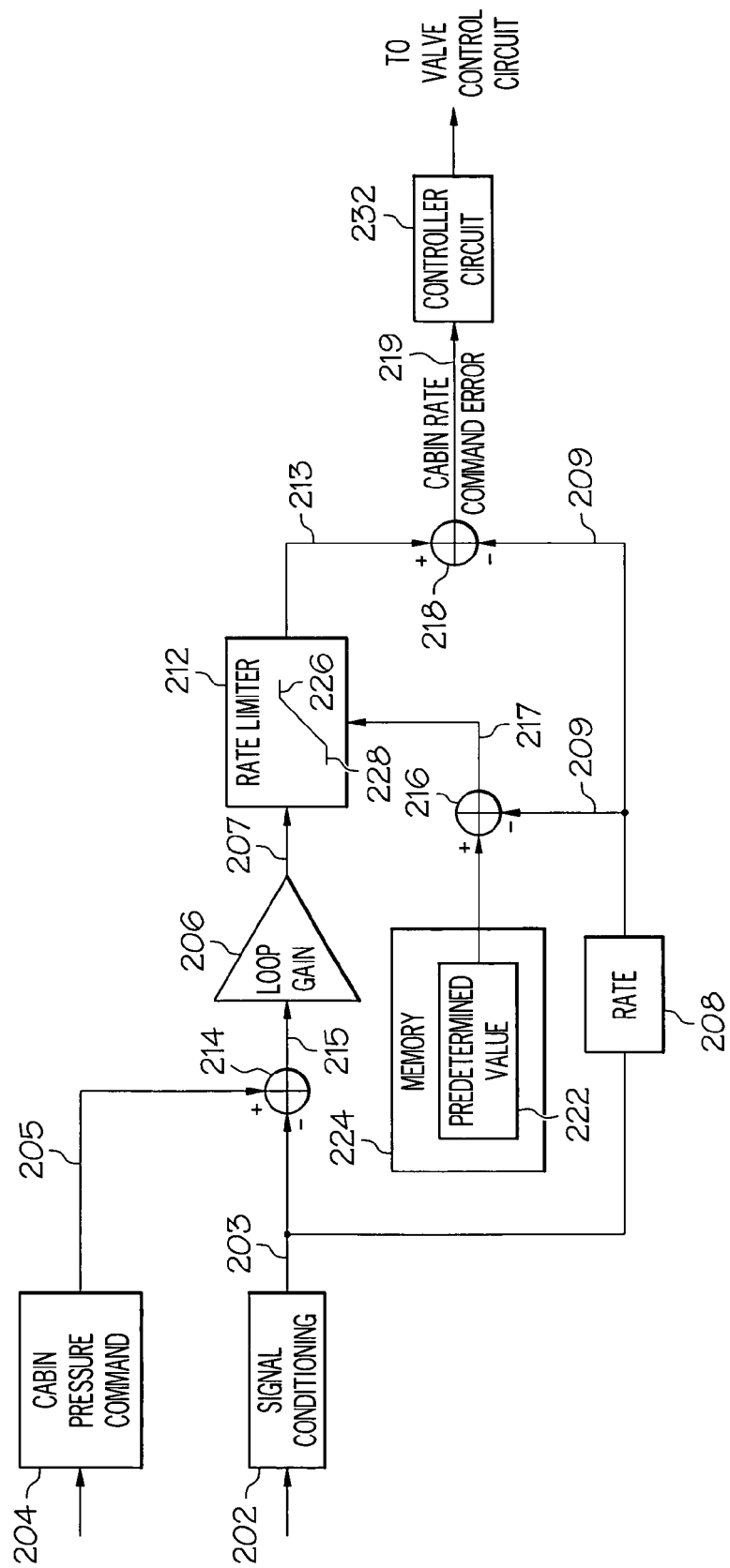
FIG. 2 is a functional block diagram of a portion of an instrumentation and control circuit that may be included in the system of FIG. 1.

Turning now to FIG. 2, a more detailed description of a portion of the instrumentation and control circuit 106 will be provided. As FIG. 2 illustrates, the instrumentation and control circuit 106, at least in the depicted embodiment, includes a pressure signal conditioning circuit 202, a cabin pressure command circuit 204, a rate command circuit 206, a rate circuit 208, and a rate limiter 212. The pressure signal conditioning circuit 202 receives the pressure signals supplied by the cabin pressure sensor 112, properly conditions and filters the pressure signal, and supplies a sensed cabin pressure signal 203 to a first comparator 214 and to the rate circuit 208. It will be appreciated that the pressure signal conditioning circuit 202 may be implemented using any one of numerous circuit topologies and may include any one of numerous types of circuits. For example, the pressure signal conditioning circuit 202 may include, as appropriate, a filter and an amplifier circuit with slope and offset compensation circuitry, which supplies an analog cabin pressure signal that is proportional to the sensed cabin pressure ($P_C$). The pressure signal conditioning circuit 202 may additionally include, as appropriate, an analog-to-digital converter (A/D) circuit that, in a conventional manner, samples the analog cabin pressure signal at a predetermined sampling frequency and supplies digital cabin pressure signals representative of the analog cabin pressure signal.

The cabin pressure command circuit 204 is coupled to receive one or more signals supplied from the avionics suite 116, and may additionally receive signals supplied from one or more sensors, including the cabin pressure and temperature sensors 112, 114. The signals from the avionics suite 116 and one or more of the sensor signals are representative of the operational mode of the aircraft. In response to the received signals, the cabin pressure command circuit 204 determines the aircraft operational mode and, based on the determined operational mode, additionally determines a target cabin pressure. The cabin pressure command circuit 204 in turn supplies a cabin pressure command signal 205, representative of the determined target cabin pressure, to the first comparator 214. It will be appreciated that the cabin pressure command circuit 204 may also be implemented using any one of numerous circuit topologies and may include any one of numerous types of circuits for determining the target cabin pressure and supplying the pressure command signal 205. For example, the cabin pressure command circuit 204 may be implemented using one or more analog circuits or one or more digital circuits. Preferably, the cabin pressure command circuit 204 is implemented digitally.

The first comparator 214, as noted above, receives both the sensed cabin pressure signal 203 from the signal conditioning circuit 202 and the cabin pressure command signal 205 from the cabin pressure command circuit 204. In response to these signals 203, 205, the first comparator 214 supplies a cabin pressure error signal 215 that is representative of a difference between the sensed (or actual) cabin pressure and the commanded cabin pressure. The cabin pressure error signal 215 is in turn supplied to the cabin rate command circuit 206, which generates a cabin pressure rate-of-change command signal 207 and supplies the cabin pressure rate-of-change command signal to the rate limiter 212.

As was also noted above, the pressure signal conditioning circuit 202 additionally supplies the sensed cabin pressure signal 203 to the rate circuit 208. The rate circuit 208, upon receipt of the sensed cabin pressure signal 203, determines the sensed cabin pressure rate-of-change and supplies a sensed (or actual) cabin pressure rate-of-change signal 209 representative thereof to both a second comparator 216 and a third comparator 218. The rate circuit 208 may be implemented using any one of numerous circuit topologies and may include any one of numerous types of circuits for determining the cabin pressure rate-of-change. For example, the rate circuit 208 may be implemented using one or more analog filter circuits or one or more digital filter circuits. Preferably, the rate circuit 208 determines the cabin pressure rate-of-change by implementing a digital filter circuit.

The second comparator 216, in addition to receiving the sensed cabin pressure rate-of-change signal 209, also receives a signal representative of a predetermined cabin pressure rate-of-change limit 222. In response, the second comparator 216 supplies a cabin pressurization rate error signal 217 representative of a difference between the sensed cabin pressure rate-of-change and the predetermined cabin pressure rate-of-change limit. The predetermined cabin pressure rate-of-change limit 222 is preferably stored in memory 224 and may be set to any one of numerous values. In a particular preferred embodiment, however, the predetermined cabin pressure rate-of-change limit 222 is set to −300 sea-level-feet-per-minute (slfpm), which, as noted above, is generally accepted as the preferred aircraft cabin pre-pressurization rate. No matter the particular value to which the predetermined cabin pressure rate-of-change limit 222 is set, it is seen that the cabin pressurization rate error signal 217 output from the second comparator 216 is supplied to the rate limiter 212.

The rate limiter 212 prevents the cabin pressurization rate from exceeding an ascent rate limit 226 and a descent rate limit 228. To do so, the rate limiter 212 limits the cabin pressure rate-of-change command signal 207 supplied from the rate command circuit 206 to values between the ascent rate limit 226 and the descent rate limit 228. More specifically, the rate limiter 212 does not limit the cabin pressure rate-of-change command signal 207 if the cabin pressure rate-of-change command signal 207 is between the ascent rate limit 226 and the descent rate limit 228. If, however, the cabin pressure rate-of-change command signal 207 is not between the ascent rate limit 226 and the descent rate limit 228, then the rate limiter 212 will set the cabin pressure rate-of-change command signal 207 equal to the specific rate limit 226, 228 that is being exceeded. As will be described in more detail further below, at least the descent rate limit 228, which corresponds to a cabin pressurization rate limit, is set based on the cabin pressurization rate error signal 217 that is supplied from the second comparator 216. Before doing so, however, the remainder of the circuit depicted in FIG. 2 will be described.

The third comparator 218, as noted above and as depicted in FIG. 2, receives the cabin pressure rate-of-change command signal 213 supplied from the rate limiter 212 and the sensed cabin pressure rate-of-change signal 209 supplied from the rate circuit 208. In response, the third comparator 218, similar to the function implemented by the first and second comparators 214, 216, supplies a cabin rate command error signal 219, representative of a difference between the commanded cabin pressure rate-of-change and the sensed (actual) cabin pressure rate-of-change, to a controller circuit 232. The controller circuit 232, in response to the cabin rate command error signal 219, generates the above-described actuation control signals. The actuation control signals are in turn supplied to the valve control circuit 108, which generates and supplies the above-described valve command signals to the outflow valve 104.

Figure 3:
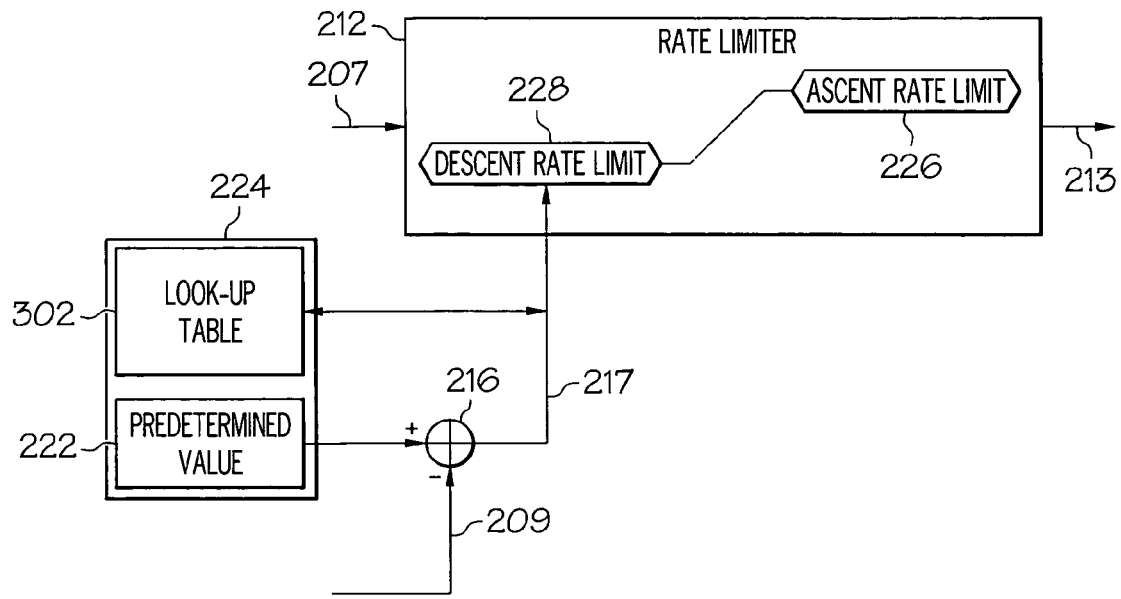
FIG. 3 is a more detailed functional block diagram of a portion of the circuit depicted in FIG. 2.

As noted above, the descent rate limit 228 within the rate limiter 212 is set based on the cabin pressurization rate error signal 217 supplied from the second comparator 216. A more detailed description of this functionality will now be provided. As depicted more clearly in FIG. 3, the descent rate limit 228 is set to a cabin pressurization rate limit value that is selected from a pressurization rate look-up table 302 that is stored in the memory 224. More specifically, the pressurization rate look-up table 302 includes a plurality of cabin pressurization rate limit values. Based on the cabin pressurization rate error signal 217 supplied from the second comparator 216, the rate limiter 212 selects a particular cabin pressurization rate limit value from the look-up table 302 and sets the descent rate limit 228 to the selected value. It will be appreciated that although the pressurization rate look-up table 302 is depicted as being stored in the same memory 224 as the predetermined rate value 222, this is merely exemplary. In alternative embodiments, the pressurization rate look-up table 302 and predetermined rate value 222 could be stored in different memories. Moreover, the pressurization rate look-up table 302 could be stored within the rate limiter 212, or any one of the other circuits depicted and described herein.

In addition to variations in the specific physical location, the particular values of the cabin pressurization rate limit values that are stored in the look-up table 302 may also vary, and may be selected according to any one of numerous processes. However, in the depicted embodiment the stored cabin pressurization rate limit values are derived from a descent rate limit versus cabin pressurization rate error function, such as the function 400 depicted in FIG. 4. In accordance with the depicted function 400, the descent rate limit (or cabin pressurization rate limit) 228 is set to the predetermined cabin pressure rate-of-change value 222 when the cabin pressurization rate error is non-negative, and to a value between the predetermined cabin pressure rate-of-change value 222 and a maximum cabin pressure rate-of-change value 402 when the cabin pressurization rate error is a negative value. More specifically, the descent rate limit 228 is set to a value that varies, preferably linearly, between the predetermined cabin pressure rate-of-change value 222 and the maximum cabin pressure rate-of-change value 402 for cabin pressurization rate errors between zero and a predetermined negative cabin pressurization rate error value 404, respectively. For cabin pressurization rate error values that are more negative than the predetermined negative cabin pressurization rate error value 404, the descent rate limit 228 is set to the maximum cabin pressure rate-of-change value 402.

Figure 4:
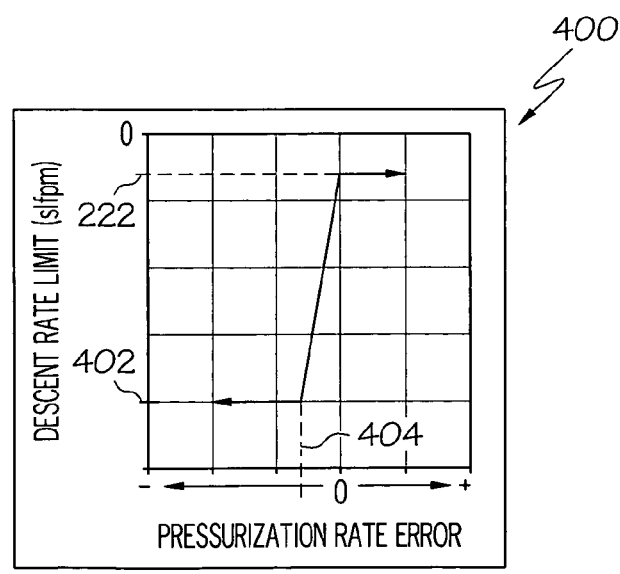
FIG. 4 is a graph of descent rate limit versus cabin pressurization rate error that may be used to implement the circuit of FIGS. 2 and 3.

Before proceeding further it is noted that positive cabin pressurization rate error values indicate the sensed cabin pressurization rate is greater than the predetermined cabin pressure rate-of-change value, and that negative cabin pressurization rate error values indicate the sensed cabin pressurization rate is less than the predetermined cabin pressure rate-of-change value. It will additionally be appreciated that the function 400 and values depicted in FIG. 4 are merely exemplary of a particular aircraft in which the cabin pressure control system 100 is installed, and that the particular function and values may vary from system to system and from aircraft to aircraft.

With the cabin pressure control system 100 described herein, rather than setting the descent rate limit 228 to an artificially low value for a predetermined time period, the descent rate limit 228 is set based on the difference between the sensed cabin pressurization rate and the preferred cabin pressurization rate. As a result, the cabin pressure control system 100 quickly attains and maintains cabin pressurization during aircraft take-off at the predetermined cabin pressure rate-of-change value 222, even with variations in cabin volume and inflow.

Figure 5:
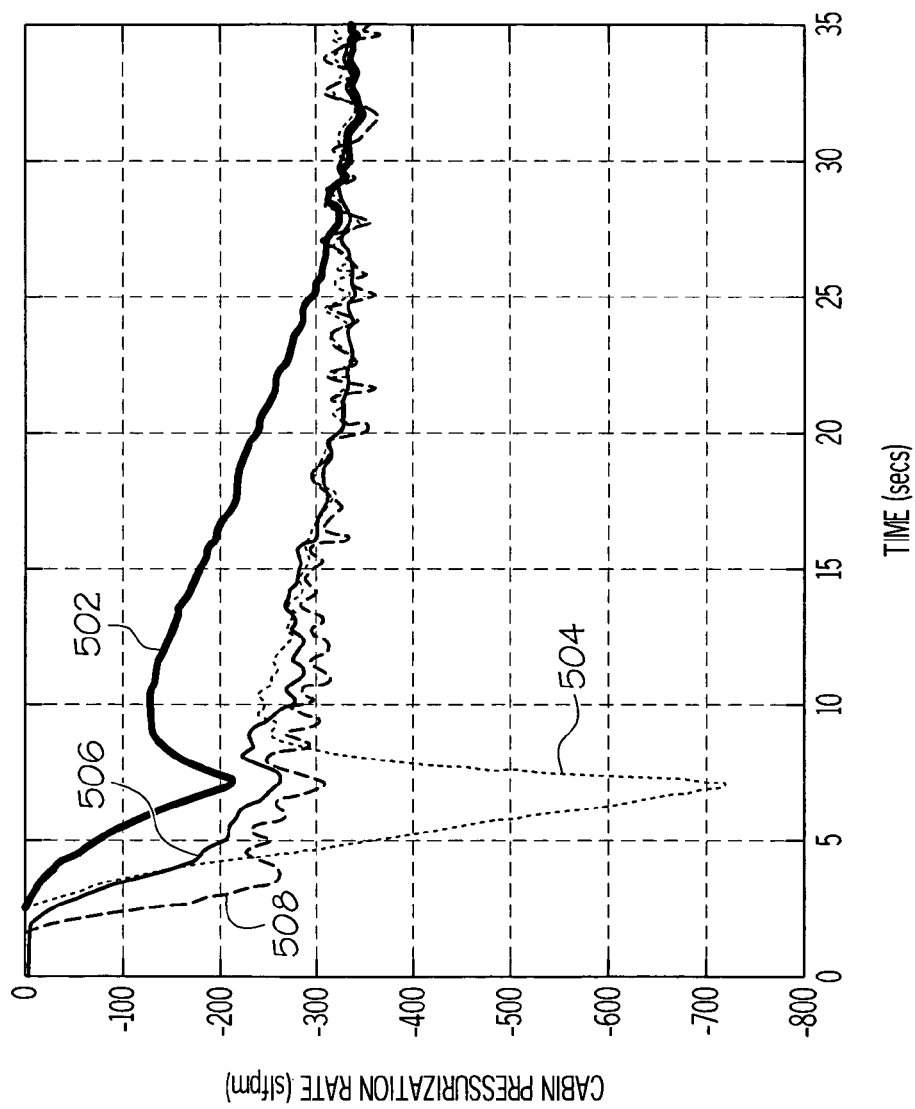
FIG. 5 is a graph of cabin pressurization rate versus time depicting responses for a prior art system and a system that implements an embodiment of the instant invention.

In support of this, reference should now to made to FIG. 5, which depicts a graph of cabin pressurization rate versus time that includes a plurality of plots for a prior art system and a system that implements an embodiment of the instant invention, and for a plurality of cabin volumes and inflows. In particular, first and second plots 502, 504 depict the response of a prior art system, and third and fourth plots 506, 508 depict the response of a system that implements and embodiment of the instant invention. More specifically, the first plot 502 depicts the response of the prior art system for an aircraft with a relatively large cabin volume and a relatively low inflow, and the second plot 504 depicts the response of the prior art system for an aircraft with a relatively small cabin volume and a relatively high inflow. Similarly, the third plot 506 depicts the response of a system that implements the present invention for an aircraft with a relatively large cabin volume and a relatively low inflow, and the fourth plot 508 depicts the response of this same system for an aircraft with a relatively small cabin volume and a relatively high inflow. As these plots depict, the prior art system is characterized by either an insufficient pressurization rate (502) or a pressurization rate overshoot (504) due to the variations in cabin volume and inflow, whereas the system that implements the instant invention is characterized by a relatively steady and repeatable pressurization rate (506, 508) despite the variations in cabin volume and inflow.

The cabin pressure control system 100 could be configured to pre-pressurize the aircraft cabin at the predetermined cabin pressure rate-of-change value during the taxi phase of aircraft take-off, since doing so provides extra time prior to actual takeoff. It will be appreciated, however, that additional input control signals may be needed, which can complicate the overall system architecture. Moreover, in the unlikely event the aircraft would need to be evacuated during the taxi phase, additional time would be needed to depressurize the pressurized cabin. Thus, the system 100 is preferably configured to initiate the cabin pre-pressurization process described herein during takeoff roll.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A control unit for controlling aircraft cabin pre-pressurization rate during take-off, comprising:
   a cabin pressure command circuit for receiving signals from a cabin temperature sensor and for producing a cabin pressure command signal;
   a first comparator for comparing the cabin pressure command signal with a sensed cabin pressure signal and producing a cabin pressure error signal;
   a rate command circuit responsive to the cabin pressure error signal and operable to supply cabin pressure rate-of-change commands;
   a second comparator configured to receive a predetermined cabin pressure rate-of-change value and sensed cabin pressure rate-of-change values and operable, in response thereto, to supply cabin pressurization rate error values representative of a difference between the predetermined cabin pressure rate-of-change limit value and the sensed cabin pressure rate-of-change values; and
   a rate limiter coupled to receive the cabin pressure rate-of-change commands and the cabin pressurization rate error values and operable, in response thereto, to
      (i) select a cabin pressurization rate limit from a finite set of discrete cabin pressurization rate limit values, the selection made according to the cabin pressurization rate errors and
      (ii) limit the cabin pressure rate-of-change commands to prevent the cabin pressurization rate from exceeding the selected cabin pressurization rate limit.

2. The control unit of claim 1, further comprising:
   memory having a plurality of cabin pressurization rate limit values stored therein,
   wherein the rate limiter is in operable communication with the memory and, in response to the cabin pressurization rate error values, sets the cabin pressurization rate limit to one of the cabin pressurization rate limit values stored in the memory.

3. The control unit of claim 2, wherein the cabin pressurization limit values are stored as a look-up table of cabin pressurization limit versus cabin pressurization rate error.

4. The control unit of claim 2, wherein the predetermined cabin pressure rate-of-change value is stored in the memory.

5. The control unit of claim 1, wherein:
   positive cabin pressurization rate error values indicate the cabin pressurization rate is greater than the predetermined cabin pressure rate-of-change value;
   negative cabin pressurization rate error values indicate the cabin pressurization rate is less than the predetermined cabin pressure rate-of-change value; and
   the rate limiter sets the cabin pressurization rate limit to the predetermined cabin pressure rate-of-change value for cabin pressurization rate error values that are non-negative.

6. The control unit of claim 5, wherein:
   the rate limiter varies the cabin pressurization rate limit between the predetermined cabin pressure rate-of-change value and a maximum cabin pressure rate-of-change value for cabin pressurization rate error values between zero and a predetermined negative cabin pressurization rate error value, respectively.

7. The control circuit of claim 6, wherein:
   the rate limiter sets the cabin pressurization rate limit to the maximum cabin pressure rate-of-change value for cabin pressurization rate error values that are more negative than the predetermined negative cabin pressurization rate error value.

8. The control unit of claim 1, wherein the predetermined cabin pressure rate-of-change value is −300 sea level feet per minute (slfpm).

9. A method of controlling aircraft cabin pre-pressurization rate during take-off, comprising the steps of:
   comparing a predetermined cabin pressurization rate value and an actual cabin pressurization rate value to determine a cabin pressurization rate error value;
   setting a cabin pressurization rate limit selected from a finite set of discrete pressurization rate values according to the cabin pressurization rate error;
   pre-pressurizing the cabin at a rate responsive to the cabin pressurization rate error value while the aircraft is in take-off roll; and
   preventing the cabin pressurization rate from exceeding the selected cabin pressurization rate limit.

10. The method of claim 9, further comprising:
    setting the cabin pressurization rate limit to the predetermined cabin pressurization rate value when the cabin pressurization rate error is a non-negative value.

11. The method of claim 9, further comprising:
    setting the cabin pressurization rate limit to a value between the predetermined cabin pressurization rate value and a maximum cabin pressurization rate limit value when the cabin pressurization rate error is a negative value.

12. The method of claim 11, wherein the value to which the cabin pressurization rate limit is set varies from the predetermined cabin pressurization rate value to the maximum cabin pressurization rate limit value when the cabin pressurization rate error is between a value of zero and a predetermined negative cabin pressurization rate error value.

13. The method of claim 12, wherein the value to which the cabin pressurization rate limit is set varies linearly from the predetermined cabin pressurization rate value to the maximum cabin pressurization rate limit value as a function of cabin pressurization rate error when the cabin pressurization rate error is between a value of zero and a predetermined negative cabin pressurization rate error value.

14. The method of claim 12, further comprising:
    setting the cabin pressurization rate limit to the maximum cabin pressurization rate limit value when the cabin pressurization rate error is a value that is more negative than the predetermined negative cabin pressurization rate error value.

15. The method of claim 9, further comprising:
    supplying a cabin pressure rate-of-change command having a magnitude representative of a commanded cabin pressurization rate;
    preventing the cabin pressure rate-of-change command from exceeding the cabin pressurization rate limit, to thereby supply a limited cabin pressure rate-of-change command;
    comparing the limited cabin pressure rate-of-change command and the actual cabin pressurization rate to determine a cabin pressurization rate command error; and
    generating the actuator control signals based on the cabin pressurization rate command error.

16. The method of claim 15, further comprising:
    positioning an outflow valve using the actuator control signals.

* * * * *